No. 701,379. Patented June 3, 1902.
D. H. O'MEARA.
VEHICLE WHEEL.
(Application filed Feb. 16, 1901. Renewed Nov. 4, 1901.)

(No Model.) 2 Sheets—Sheet 1.

Witnesses:
Geo. W. Young
B. C. Roloff

Inventor
Denis H. O'Meara
By H. G. Underwood
Attorneys

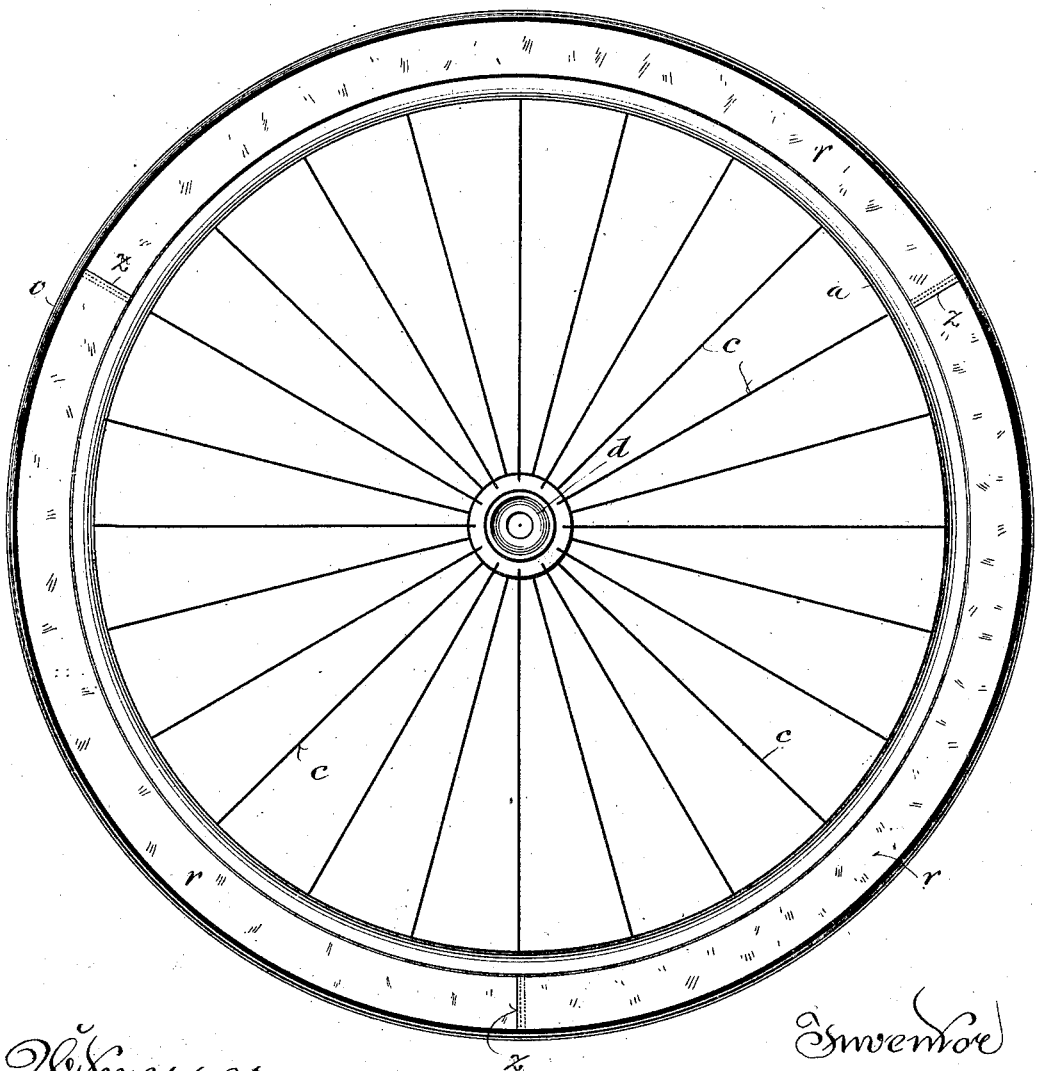

UNITED STATES PATENT OFFICE.

DENIS H. O'MEARA, OF WORCESTER, MASSACHUSETTS.

VEHICLE-WHEEL.

SPECIFICATION forming part of Letters Patent No. 701,379, dated June 3, 1902.

Application filed February 16, 1901. Renewed November 4, 1901. Serial No. 81,078. (No model.)

*To all whom it may concern:*

Be it known that I, DENIS H. O'MEARA, a citizen of the United States, and a resident of Worcester, in the county of Worcester and State of Massachusetts, have invented certain new and useful Improvements in Vehicle-Wheels; and I do hereby declare that the following is a full, clear, and exact description thereof.

My invention relates to vehicle-wheels; and it consists in certain peculiarities of construction and combination of parts, as will be fully set forth hereinafter with reference to the accompanying drawings and subsequently claimed.

Figure 1:
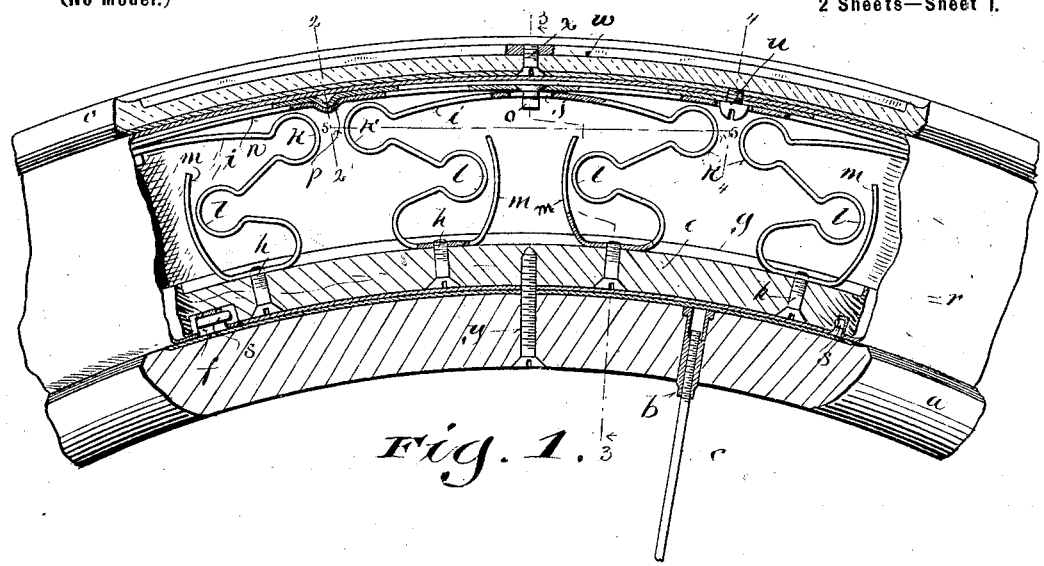
Figure 2:
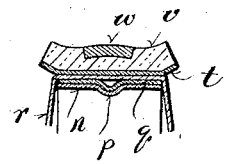
Figure 3:
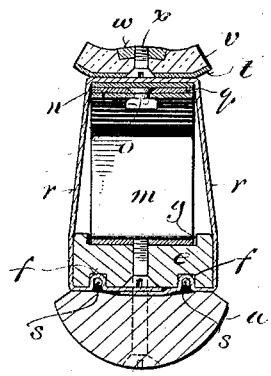
Figure 4:
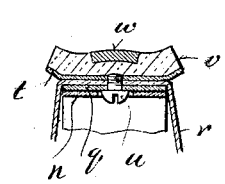
Figure 5:
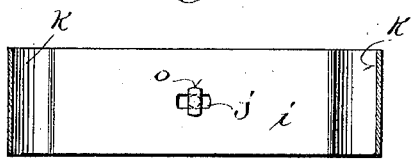

In the said drawings, Figure 1 is a representation, partly in elevation and partly in section, of the rim and tire of a wheel embodying my present invention. Figs. 2, 3, and 4 are transverse sectional views taken on the lines 2 2, 3 3, and 4 4, respectively, of Fig. 1. Fig. 5 is a detail view, partly in section, on the line 5 5 of Fig. 1 and illustrating the attachment of the springs and tire. Fig. 6 is a side elevation of one of my complete wheels.

My invention is especially designed to take the place of wheels having pneumatic tires, such as are commonly employed in connection with bicycles, tricycles, automobiles, and other vehicles, and obviates the objectionable liability of such tires to being punctured or otherwise rendered unfit for use, while at the same time affording the desired resiliency and lightness.

Referring to the drawings, $a$ represents the annular rim, preferably of wood, which is perforated at intervals to receive the nipples $b$ for the spokes $c$, which extend and are secured in the usual manner to the hub $d$. The outer periphery of the rim $a$ is preferably very slightly concaved. Another annular rim $e$, also preferably of wood, of greater diameter than the rim $a$, so as to slip over it, as afterward described, is of generally oblong shape in cross-section, but provided with two parallel annular grooves $ff$ in the inner side and with a wide annular channel $g$ on its opposite or outer surface, the latter being for the reception of the springs, which are each composed of properly-bent single strips of flat steel, the shape of these springs being best shown in Fig. 1 and they being of a width to just snugly fit within the said channel $g$, being held to the rim $e$ by screws $h$, passing through said rim. The outer portions of these springs (shown at $i$) are convex, with a central slot $j$, while both ends of said outer portion are bent into rounded loops $k$, then bent obliquely inwardly and into like rounded loops $l$, thence bent obliquely outwardly and rounded down to a horizontal line, (with screw-threads tapped therein to receive the screws $h$, already named,) and finally the ends are brought up to form the stop-arms $m$. Encircling the annular series of springs is a metal band $n$, preferably of steel and perforated at intervals corresponding to the slots $j$ in the outer portions $i$ of the springs, to which springs the said band $n$ is locked by means of the double-headed rivets $o$, whose oblong heads are passed down through the slots in the springs and given a quarter-turn, as best indicated in Fig. 5, while at intervals the said band $n$ is formed with inward-extending indentations which project between certain of the springs, as indicated at $p$. Another metal band $q$, also preferably of steel, surrounds the band $n$, to which it is held by inward indentations fitting into the described indentations $p$ in the band $n$, and all this part of the tire, comprising the supplementary rim $e$, the annular series of springs, and the two metal bands $n$ and $q$, is enveloped in strips of suitable fabric $r$, preferably what is known as "waterproof" fabric or "enameled" cloth, whose edges are overlapped on the inner surface of the rim $e$ and held in place by spring-wire rings $s$, which force the fabric into the described grooves $f$ in said rim, all as best shown in Fig. 3.

Encircling the fabric-protected outer band $q$ is another metal band $t$, preferably of aluminium and of greater width than the other bands, the projecting edges of this band $t$ being obliquely and outwardly inclined and all three of the described metal bands being united at intervals by the screws $u$, whose heads fit in slots in the band $n$ and whose shanks pass through perforations in the band $q$ and fabric $r$ and engage with screw-threaded bores tapped in the band $t$, all as best shown in Fig. 4. Conforming in shape to and encircling this band $t$ is a thick annular band $v$, of rubber or other flexible material, centrally provided with an encircling narrow metal band $w$, also preferably of aluminium and outwardly convex, this band $w$ being held in place by series of screws $x$ at intervals, whose heads rest in countersunk openings in the band $t$ and whose shanks pass through the rubber band $v$ and engage with screw-threaded bores tapped in the outer band $w$, the said bands $v$ and $w$ forming the tread of the wheel. The spring-rim and its tread are secured to the rim $a$ by series of screws $y$, passed through the said rim $a$ and the folds of the fabric $r$ into the rim $e$, and when it is desired to remove the tread and its supporting-band $t$ from the spring-rim and its fabric-incased parts (after the latter has been released from the rim $a$ by the withdrawal of the screws $y$) it is a simple matter to remove the wire rings $s$ (whose ends need not be united) from the grooves $f$, spread apart the fabric covering $r$, and withdraw the screws $u$, when the tread part can be readily pushed off, the assembling of all these parts being accomplished by the reverse of these operations. Any desired number of strips of fabric $r$ may be employed; but I find three a convenient number, as shown in Fig. 6, where the overlapping edges are indicated by the letter $z$.

In practice I may unite the ends of my several metal bands in any manner found most convenient and practicable, as by electric welding or riveting, so as to form continuous hoops of said bands, and by reason of my described construction should any of the parts become injured through accident the particular part thus injured can be readily replaced without requiring any change in the uninjured portions.

My wheels will be found to possess great lightness and flexibility, and at the same time the described stop-arms $m$ of the springs guard against undue compression of the spring-rim, thus protecting the springs from injury and increasing their longevity.

Having thus described my invention, what I claim as new, and desire to secure by Letters Patent, is—

1. In a vehicle-wheel, the combination with an inner rim to which the spokes are secured, of a supplementary rim removably secured to and bearing against said inner rim; an annular series of double flat metallic springs removably secured to said supplementary rim; an encircling metal band removably secured to said springs; and an outer composite tread of metal and flexible material, removably secured to said encircling metal band.

2. In a vehicle-wheel, the combination of a rim and encircling metal band, united by an interposed annular series of double flat metallic springs, having projecting stop-arms to prevent undue compression.

3. In a vehicle-wheel, the combination with an inner rim to which the spokes are secured, of a supplementary rim and encircling metal band, united by an interposed series of double flat metallic springs, forming a spring-rim removably secured to said inner rim, said springs having projecting stop-arms to prevent undue compression of said spring-rim.

4. In a vehicle-wheel, the combination with an inner rim to which the spokes are secured, of a supplementary rim and encircling metal band, united by an interposed series of double flat metallic springs, forming a spring-rim removably secured to said inner rim, said springs having projecting stop-arms to prevent undue compression of said spring-rim, and an outer composite tread of metal and flexible material, removably secured to said spring-rim.

5. In a vehicle-wheel, the combination with an inner rim to which the spokes are secured, of a supplementary rim and encircling metal band, united by an interposed annular series of double flat metallic springs, forming a spring-rim removably secured to said inner rim; an outer composite tread of metal and flexible material, removably secured to said spring-rim, and strips of waterproof fabric entirely surrounding said spring-rim, and interposed between it and said inner rim, and between said spring-rim and said outer composite tread.

6. In a vehicle-wheel, the combination with an inner rim to which the spokes are secured, of a removable supplementary rim having annular grooves on its inner surface, and a wide annular channel on its outer surface; an annular series of double flat metallic springs seated in said channel and secured to said supplementary rim, said springs having slots in their outer surfaces and stop-arms to prevent undue compression; an encircling metal band resting on said springs and removably united thereto by double-headed rivets; another metal band encircling the first-named band and held thereto by intermatching inward indentations in the two bands; strips of waterproof fabric entirely surrounding and inclosing the said supplementary rim, springs and metal bands; spring-wire rings fitting in said annular grooves against said fabric, and thereby holding same in place; and an outer composite tread of metal and flexible material, resting on the fabric-covered metal band, and removably secured thereto.

7. In a vehicle-wheel, the combination with an inner rim to which the spokes are secured, of a removable supplementary rim having annular grooves on its inner surface, and a wide annular channel on its outer surface; an annular series of double flat metallic springs seated in said channel and secured to said supplementary rim, said springs having slots in their outer surfaces and stop-arms to prevent undue compression; an encircling metal band resting on said springs and removably united thereto by double-headed rivets; another metal band encircling the first-named band and held thereto by intermatching inward indentations in the two bands; strips of waterproof fabric entirely surrounding and inclosing the said supplementary rim, springs, and metal band; spring-wire rings fitting in said annular grooves against said fabric, and thereby holding same in place; another metal band of greater width than the other bands, having its projecting edges obliquely and outwardly inclined, encircling and resting on the fabric-covered metal band and removably secured thereto; a thick annular band of flexible material conforming in shape to and encircling the said wide metal band; an outer narrow metal band encircling the center of said wide band, and forming therewith the tread of the wheel; and series of screws uniting the wide tread-supporting metal band and the said central narrow outer metal band.

8. In a vehicle-wheel, the combination with an inner rim to which the spokes are secured, of a supplementary rim, and encircling band, united by an interposed series of springs, forming a spring-rim removably secured to said inner rim, and the said supplementary rim having annular grooves on its surface adjacent to said inner rim; strips of waterproof fabric entirely surrounding and inclosing the said supplementary rim, springs and encircling band; and spring-wire rings fitting in said annular grooves against said fabric, and thereby holding the same in place.

In testimony that I claim the foregoing I have hereunto set my hand, at Worcester, in the county of Worcester and State of Massachusetts, in the presence of two witnesses.

DENIS H. O'MEARA.

Witnesses:
MARGARET A. BRITT,
EBEN F. THOMPSON.